Dec. 17, 1957  J. LOBBY  2,816,929
PROCESS FOR BETA-DIETHYLAMINOPROPIOPHENONE
Filed July 5, 1956
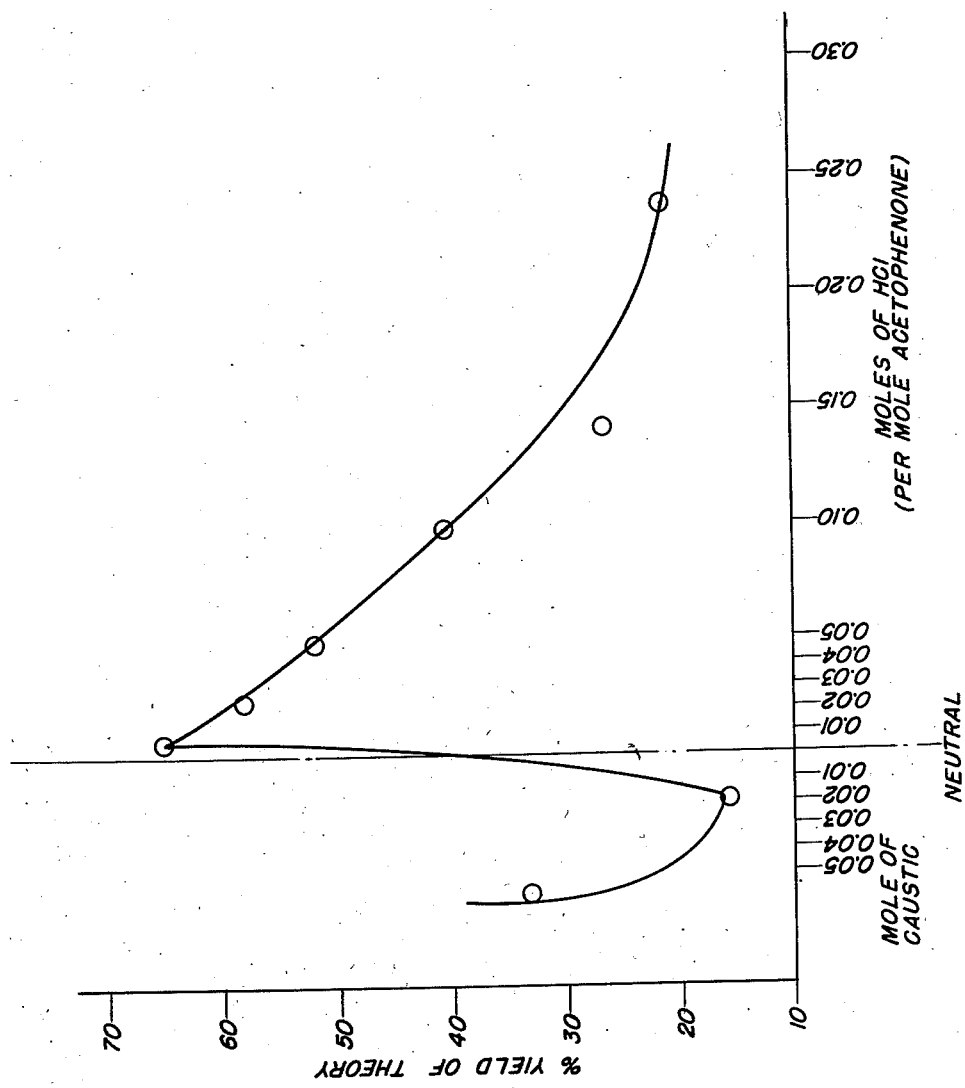
INVENTOR.
JOSEPH LOBBY,
BY
AGENT.

United States Patent Office 2,816,929
Patented Dec. 17, 1957

2,816,929

PROCESS FOR BETA-DIETHYLAMINO-PROPIOPHENONE

Joseph Lobby, Middlesex, N. J., assignor to American Cyanamid Company, New York, N. Y., a corporation of Maine Application July 5, 1956, Serial No. 596,026

4 Claims. (Cl. 260—570.5)

This invention relates to an improved process for the preparation of beta-diethylaminopropiophenone, and more specifically, to an improved process for the manufacture of this compound by the reaction of acetophenone, diethylamine and formaldehyde under carefully controlled conditions of acidity.

Beta-diethylaminopropiophenone is a useful chemical intermediate for the preparation of therapeutic agents. Its principal use is in the preparation of 1-cyclohexyl-3-diethylamino - 1 - phenylpropanol - 1 - ethiode (or tridihexethyl iodide), which is useful as a gastric inhibitor in the treatment of stomach ulcers and other gastric disturbances involving excess secretion. This is prepared from the diethylaminopropiophenone by a Grignard reaction with cyclohexyl magnesium chloride to form 1-cyclohexyl-3-diethylamino-1-phenyl propanol, followed by quaternization with ethyl iodide to form the therapeutic agent. tridihexethyl iodide is a widely used material, and it is therefore very important that the cost of its manufacture be kept as low as possible. The yields of the individual steps in preparing such a compound are important factors in the cost. Any method by which the yield of the reactions can be increased is an important contribution to this goal.

The preparation of beta-diethylaminopropiophenone normally involves the condensation of formaldehyde with diethylamine and acetophenone. The reaction is carried out in the presence of water or organic solvents, the latter being used when one uses para-formaldehyde as the source of the formaldehyde. The yields of this reaction in the past have been unsatisfactorily low, although sufficiently better than alternative methods of synthesis to warrant its use on a commercial scale.

I have found that the reaction is peculiarly sensitive to the pH of the reaction medium, and that it is possible by careful control of the amount of acid added to the reaction mixture to obtain yields of high quality product greatly in excess of the yields previously known for this reaction. This is most surprising because reactions of this type are not ordinarily known to be pH sensitive. In the past, acids have occasionally been added to the condensations of para-formaldehyde with an amine and a ketone having an active hydrogen for the purpose of assisting in the liberation of free formaldehyde from para-formaldehyde. However, in these cases, there is no need to control the amount of acid since the yield does not change appreciably when large amounts of acid are added. In the process of my invention, the amount of acid present is critical. It is necessary that from 0.004 to 0.07 equivalent of hydrogen ion be added per mol of acetophenone used. Usages above and below the critical range cause greatly reduced yields of the desired product and when, instead of acid, caustic is used, the product obtained is not the desired one.

My invention can be better understood with reference to the figure, which is a graph of the yield of product against the mols of caustic or hydrochloric acid added per mol of acetophenone used. It can be clearly seen that there is a very critical range just on the acid side of neutral, in which good yields are obtainable. When larger amounts of acids are used, the yields drop rapidly to very low values. When caustic is added instead, the yields also drop very low. The addition of more caustic gives an apparent rise in the yield but it is found that the product obtained is not the desired one.

In the practice of my invention, substantially equimolar quantities of the amine hydrochloride and acetophenone are used, with at least an equivalent amount of formaldehyde. An excess of formaldehyde is preferred. The reaction is carried out in a lower alkanol solvent such as methanol, ethanol, propanol or butanol, containing the mineral acid used. The formaldehyde is most conveniently used in the form of paraformaldehyde, although it can be used in the form of a solution of free formaldehyde. The amine is usually used as the hydrochloride salt, although the free amine can be used. The acid which is added to the mixture for the improved result is in addition to any acid which may be needed to neutralize the amine when a free amine is used.

In the practice of my invention, I prefer to use hydrochloric acid as the mineral acid. However, equivalent results are obtained by using equivalent amounts of sulfuric, phosphoric, hydrobromic or other mineral acids or mixtures thereof. The amount of acid added is very critical. In order to get good yields of the desired product one must add from 0.004 to 0.07 equivalent of hydrogen ion per mol of acetophenone. When a mono-basic mineral acid such as hydrochloric is used, this, of course, is mols of acid per mols of acetophenone. The criticality of this usage of acid is clearly evident from the figure, for it can be seen that when no acid is used the yield of product is only about 35% and on the alkaline side with the addition of as little as 0.02 mol of sodium hydroxide per mol of acetophenone the yield drops to about 16%. When the addition of as much as 0.14 mol of acid per mol of acetophenone is used, the yield again drops to below 22%. Within the range which I have discovered, yields of the order of 45 to 90% can be obtained. The data used to give the graph was from laboratory experiments in which the control of the exact amount of acid was extremely difficult. On a larger scale, in plant production, where larger quantities are used and the exact proportion can be more readily controlled, the peak of the curve is over 20% higher. Within the critical range, the exact usage which gives the maximum yield, and is therefore to be preferred, is between 0.0045 to 0.005 mol of acid per mol of acetophenone.

In the practice of my invention, the reaction is carried out in the usual way by heating the mixture under reflux until the condensation is complete, followed by isolation of the product. The isolation step is usually carried out by removal of the organic solvent and the addition of water followed by extraction of the product with an ether such as dibutyl ether. Such extracts, after careful drying, can be used directly in the Grignard reaction which follows this step in the preparation of tridihexethyl iodide.

My invention can be further illustrated by the following examples in which parts are by weight unless otherwise specified.

*Example 1*

A slurry of 136.9 parts (1.25 mols) of diethylamine hydrochloride in 230 parts of anhydrous ethanol is prepared. Five-thousandth mol of hydrogen chloride added as an alcohol solution of hydrogen chloride. To the mixture are then added 150 parts (1.25 mols) of acetophenone and 38.1 parts (1.27 mols) of formaldehyde as para-formaldehyde powder. The mixture is heated at the reflux temperature for a short period. The mixture is then cooled to 50° C. An additional 18.3 parts (0.61 mol) of formaldehyde is added as para-formaldehyde and the mixture is again heated until the reaction is substantially complete. The bulk of the ethanol is then removed by distillation at reduced pressure. The residue is drowned in 600 parts of cold water and is extracted twice with 70 parts of dibutyl ether, these first two extracts being discarded. The water layer is then made alkaline to phenol-phthalein by addition of 50% caustic solution and extracted twice with 185 parts of dibutyl ether. The combined dibutyl ether extracts obtained after basification are dried over calcium chloride and the ether is removed by distillation yielding 167.5 parts of beta-diethylaminopropiophenone (65.3% yield).

When piperidine HCl is used in a similar reaction for the preparation of beta-(1-piperidyl) propiophenone, the amount of acid present in the reaction mixture is not critical for good yields. For example, the above procedure is followed, using 1.69 mols of piperidine hydrochloride, an equivalent amount of acetophenone, and an excess of para-formaldehyde (4.33 mols) in anhydrous ethanol. The yield of beta (1-piperidyl) propiophenone hydrochloride is 82.0% of theory. When a run is carried out by the same procedure, except that an excess of 30 ml. of 22.85% alcoholic HCl is added to the reaction mixture (corresponding to 0.188 mols of HCl per 1.69 mol of acetophenone) a yield of 83.0% of theory results.

*Example 2*

A charge of 438 pounds of diethylamine hydrochloride is added to 500 pounds of anhydrous ethanol. Approximately 2 pounds (0.0047 mol per mol of acetophenone) of concentrated hydrochloric acid is added. To the mixture is added 480 lbs. of acetophenone and 120 lbs. of para-formaldehyde, and the mixture is heated at the reflux temperature for one hour. It is then cooled. An additional 64.5 lbs. of para-formaldehyde is added and the mixture is heated at reflux for two more hours. It is then cooled to 50° C. Most of the alcohol is removed by a vacuum distillation and the mixture is drowned in 2000 lbs. of water. The mixture is then extracted twice with dibutyl ether to remove unreacted acetophenone. The aqueous layer is then made alkaline by addition of 50% caustic soda solution, and the beta-diethylaminopropiophenone is extracted with dibutyl ether. The dibutyl ether solution is dried and may be used for conversion to the cyclohexyl propanol derivative in a Grignard reaction; or the beta-diethylaminopropiophenone may be isolated from the dibutylether solution. In this size run yields of from 80 to 85% are obtained.

*Example 3*

Using the procedure described in Example 2, a series of runs is carried out on a laboratory scale, based on 1.25 mols of acetophenone. The amount of acid added is varied by the addition of varying amounts of alcoholic HCl. Several runs are also made adding caustic soda. The results, which are the basis for the figure, are as follows:

| Mols HCl added per 1.25 mol run | Mols HCl added per mol acetophenone | Mols NaOH added per 1.25 mol run | Mols NaOH added per mol acetophenone | Percent yield |
| --- | --- | --- | --- | --- |
| 0.0058 | .0047 | | | 65.3 |
| 0.029 | .023 | | | 59.2 |
| 0.058 | .047 | | | 52.8 |
| 0.116 | .094 | | | 40.8 |
| 0.174 | .141 | | | 27.2 |
| 0.290 | .235 | | | 22.2 |
| None | None | None | None | 35.8 |
| None | None | None | None | 35.4 |
| | | 0.025 | .02 | 17.35 |
| | | 0.025 | .02 | 16.10 |
| | | 0.075 | .06 | 33.7 |

Tests indicated that a product other than the desired one was obtained in the last run with excess caustic.

*Example 4*

The procedure of Example 1 is followed, except that an equivalent amount of sulfuric acid is used. A similar yield is obtained. Similar results are obtained when hydrobromic, nitric, or phosphoric acids are used.

I claim:
1. In the process for the preparation of beta-diethylaminopropiophenone by the reaction of diethylamine hydrochloride with acetophenone and formaldehyde in lower alkanol solvents, the improvement which comprises carrying out the reaction in the presence of from 0.004 to 0.07 equivalent of a mineral acid per mol of acetophenone used.
2. The process of claim 1 in which the mineral acid is hydrochloric acid.
3. The process of claim 2 in which the usage of hydrochloric acid is from 0.0045 to 0.005 equivalent per mol of acetophenone.
4. The process of claim 1 in which the acid used is sulfuric acid.

References Cited in the file of this patent

UNITED STATES PATENTS 2,686,808    Sprague    Aug. 17, 1954

OTHER REFERENCES

Mannich et al.: Ber. der deut. Chem. Ges. 55B, 356–65 (1922).